US009088615B1

(12) United States Patent
Avlasov et al.

(10) Patent No.: US 9,088,615 B1
(45) Date of Patent: Jul. 21, 2015

(54) DETERMINING A REDUCED SET OF REMEDIATION ACTIONS FOR ENDPOINT INTEGRITY

(75) Inventors: Yan Avlasov, Cambridge, MA (US); Steven Erickson, Newton, MA (US)

(73) Assignee: Pulse Secure, LLC, San Jose, CA (US)

( * ) Notice: Subject to any disclaimer, the term of this patent is extended or adjusted under 35 U.S.C. 154(b) by 1498 days.

(21) Appl. No.: 12/183,628

(22) Filed: Jul. 31, 2008

(51) Int. Cl.
*G06F 17/00* (2006.01)
*H04L 29/06* (2006.01)
*G06F 21/62* (2013.01)

(52) U.S. Cl.
CPC ............ *H04L 63/20* (2013.01); *G06F 21/6218* (2013.01)

(58) Field of Classification Search
CPC ...................................................... H04L 63/20
USPC ............................................................ 726/1
See application file for complete search history.

(56) References Cited

U.S. PATENT DOCUMENTS

| 5,771,243 | A  | * | 6/1998  | Lee et al. ....................... 714/738 |
| 7,870,242 | B2 | * | 1/2011  | Nguyen ......................... 709/223 |
| 8,661,534 | B2 | * | 2/2014  | Chatterjee et al. .............. 726/22 |
| 2003/0212651 | A1 | * | 11/2003 | Hosken .............................. 707/1 |
| 2007/0107043 | A1 | * | 5/2007  | Newstadt et al. ................... 726/2 |
| 2007/0143392 | A1 | * | 6/2007  | Choe et al. ..................... 709/203 |
| 2007/0143851 | A1 | * | 6/2007  | Nicodemus et al. ............. 726/25 |
| 2007/0250595 | A1 | * | 10/2007 | Landfield ....................... 709/218 |
| 2008/0189788 | A1 | * | 8/2008  | Bahl ............................... 726/25 |
| 2008/0244690 | A1 | * | 10/2008 | Kulkarni et al. .................. 726/1 |
| 2009/0007264 | A1 | * | 1/2009  | Chatterjee et al. .............. 726/22 |

OTHER PUBLICATIONS

S. Hanna, T. Hardjono, and S. Thomson, Network Endpoint Assessment (NEA) Problem Statement draft-thomson-nea-problem-stataement-03.txt, Network Working Group Internet-Draftm, Jun. 24, 2006, pp. 1-22.*
Djamel H. Sadok, et al., RIP—A robust IP access architecture, Computers & Security, Feb. 19, 2009, pp. 359-380.*
Hamed Okhravi et al., Application of trusted network technology to industrial control networks, Jul. 11, 2009, pp. 84-94.*
ProCurve Networking by HP, IDM and Endpoint Integrity Technical Overview, Hewlett-Packard Development Company, L.P., Feb. 2006, 9 pgs.

* cited by examiner

*Primary Examiner* — Luu Pham
*Assistant Examiner* — Canh Le
(74) *Attorney, Agent, or Firm* — Shumaker & Sieffert, P.A.

(57) ABSTRACT

In general, the disclosure relates to techniques for identifying a reduced set of remediation actions that are to be performed by a network endpoint to achieve compliance with a security policy defined by a network entity. One example method comprises receiving integrity data via a network from a network endpoint, performing a plurality of tests on the integrity data to generate corresponding test results, identifying a set of remediation actions based upon the test results, and comparing the remediation actions in the set. The method further comprises eliminating at least one remediation action in the set based upon the comparison to form a reduced set of remediation actions, and sending the reduced set of remediation actions to the network endpoint, wherein each remediation action in the reduced set specifies an action to be performed by the network endpoint to achieve compliance with a security policy.

13 Claims, 8 Drawing Sheets

(12) United States Patent

DETERMINING A REDUCED SET OF REMEDIATION ACTIONS FOR ENDPOINT INTEGRITY

TECHNICAL FIELD

This disclosure relates to integrity evaluation of endpoints within a computer network.

BACKGROUND

Within a computer network, various network endpoints may initiate connection requests to one or more network entities that provide services within the network. For example, a client device, such as a personal computer, may initiate a connection request to a server device that is capable of providing various services to the client device. In some cases, the client device may initiate a connection request to the server device via a public network, such as the Internet.

Because different types of network endpoints may wish to communicate with a given network entity, such as a server, the network entity may wish to perform one or more integrity checks, or an integrity evaluation, of these network endpoints before allowing them to have access. An integrity check may verify endpoint compliance with an integrity policy that is defined by the network entity, and the policy may comprise one or more integrity criteria. For example, the network entity may attempt to verify that each of the network endpoints has an appropriate model and/or version of anti-virus software before granting them access to the network entity.

If the network entity determines that a given network endpoint fails an integrity check, the network entity may identify one or more remediation actions that are to be performed by the network endpoint to conform to one or more integrity criteria and to obtain access to the network entity. For example, if the network entity determines that the network endpoint does not have the proper model and/or version of anti-virus software, the network entity may specify a remediation action of installing the proper model and/or version of anti-virus software on the network endpoint. Checking endpoint integrity against a policy on the network entity with multiple criteria may result in several remediation actions that are to be performed by the network endpoint.

SUMMARY

In general, the disclosure relates to techniques for identifying a reduced set of remediation actions that are to be performed by a network endpoint to achieve compliance with a security policy defined by a network entity, such that the network endpoint may obtain access to the network entity. Because an initial set of multiple remediation actions may, in some cases, contain contradictory or redundant actions, performing all remediation actions in the initial set may be inefficient, or even potentially put an endpoint in an invalid state. Thus, the present disclosure relates to techniques for eliminating potentially contradictory and/or redundant actions, and providing a reduced set of actions that may be performed by the endpoint to achieve compliance with the security policy. In some cases, remediation actions may be eliminated based upon their associated and relative weighting factors and/or costs.

In one embodiment, a method comprises receiving integrity data via a network from a network endpoint, performing a plurality of tests on the integrity data to generate corresponding test results, identifying a set of remediation actions based upon the test results, and comparing the remediation actions in the set. The method further comprises eliminating at least one remediation action in the set based upon the comparison to form a reduced set of remediation actions, and sending the reduced set of remediation actions to the network endpoint, wherein each remediation action in the reduced set specifies an action to be performed by the network endpoint to achieve compliance with a security policy.

In one embodiment, a computer-readable medium comprises instructions that cause one or more processors to receive integrity data via a network from a network endpoint, perform a plurality of tests on the integrity data to generate corresponding test results, identify a set of remediation actions based upon the test results, and compare the remediation actions in the set. The computer-readable medium further comprises instructions that cause the one or more processors to eliminate at least one remediation action in the set based upon the comparison to form a reduced set of remediation actions, and send the reduced set of remediation actions to the network endpoint, wherein each remediation action in the reduced set specifies an action to be performed by the network endpoint to achieve compliance with a security policy.

In one embodiment, an apparatus comprises one or more verification modules, an integrity evaluation module, and a security policy. The one or more verification modules are configured to receive integrity data via a network from a network endpoint, perform a plurality of tests on the integrity data to generate corresponding test results, and identify a set of remediation actions based upon the test results. The integrity evaluation module is configured to compare the remediation actions in the set, eliminate at least one remediation action in the set based upon the comparison to form a reduced set of remediation actions, and send the reduced set of remediation actions to the network endpoint. Each remediation action in the reduced set specifies an action to be performed by the network endpoint to achieve compliance with the security policy.

The details of one or more embodiments of the disclosure are set forth in the accompanying drawings and the description below. Other features, objects, and advantages will be apparent from the description and drawings, and from the claims.

DETAILED DESCRIPTION

Figure 1:
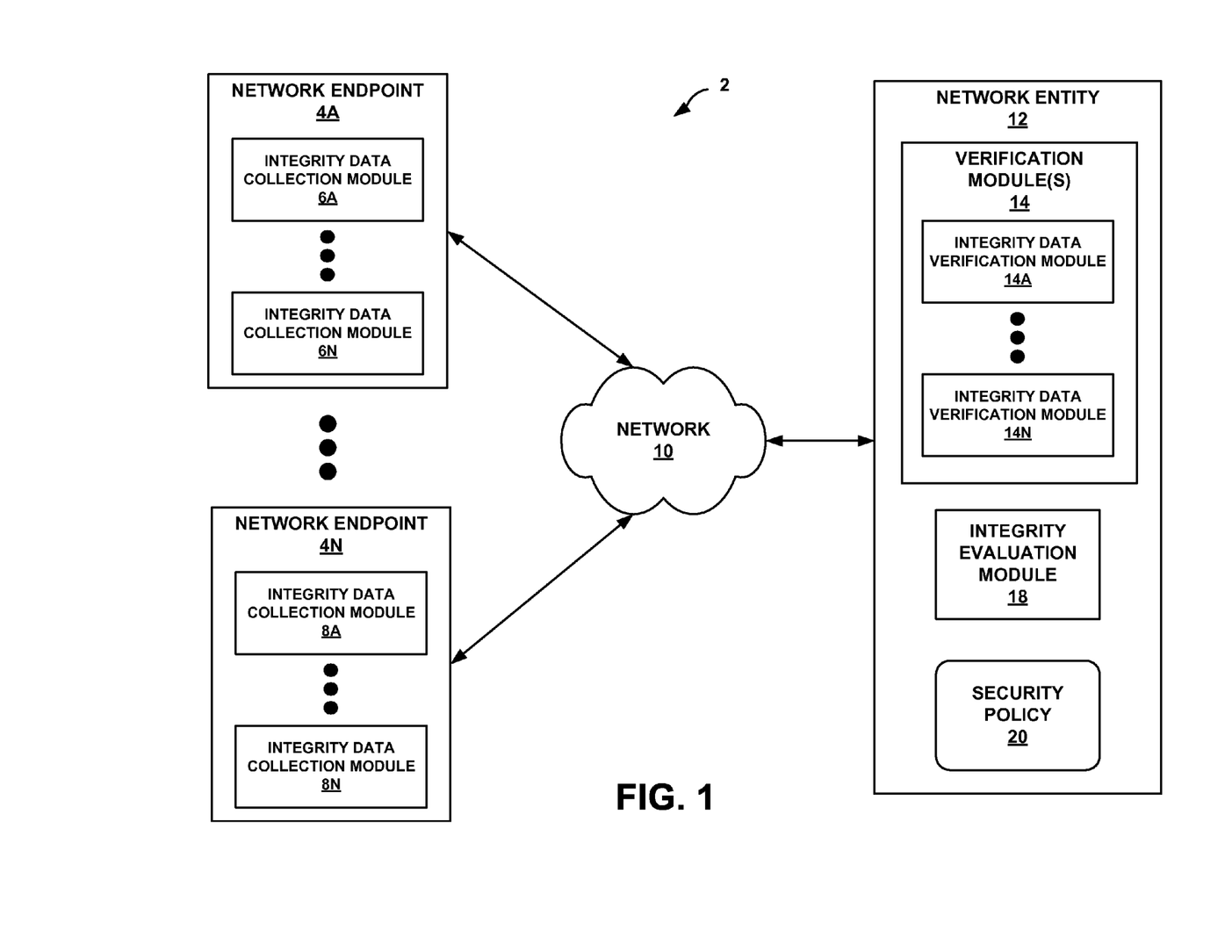
FIG. 1 is a block diagram illustrating one or more network endpoints that are coupled to a network entity via a network in a system, where the network entity evaluates integrity data provided by the network endpoints, according to one embodiment.

FIG. 1 is a block diagram illustrating one or more network endpoints 4A-4N coupled to a network entity 12 via a network 10 in a system 2, where network entity 12 evaluates integrity data provided by network endpoints 4A-4N, according to one embodiment. In this embodiment, the one or more network endpoints 4A-4N may send connection requests to network entity 12 via network 10, so that network endpoints 4A-4N may obtain access to services that are provided by network entity 12. For example, network entity 12 may be a network, or web-based, server that provides certain network-based services.

Network entity 12 may determine whether to grant or deny access to any of network endpoints 4A-4N based upon evaluation of integrity data provided by these endpoints. If network entity 12 denies access to identified network endpoints, network entity 12 may provide a set of remediation actions that are to be performed to achieve compliance with a security policy 20. Upon performing the remediation actions, the identified network endpoints may then be granted access to network entity 12. In some cases, the set of remediation actions may comprise a reduced, or a minimal, set of actions that are to be performed to achieve compliance with security policy 20.

Each network endpoint 4A-4N includes one or more integrity data collection modules. For example, network endpoint 4A includes one or more integrity data collection modules 6A-6N, and network endpoint 4N includes one or more integrity data collection modules 8A-8N. Each integrity data collection module is a module that is capable of collecting integrity data from an endpoint and sending the data across network 10 to network entity 12. In some cases, the integrity data collection modules may comprise software modules that are installed on the corresponding endpoint.

Integrity data includes any data that may be collected from a network endpoint and that may be tested by network entity 12, with respect to security policy 20, to determine whether to grant or deny access of the endpoint to network entity 12 via network 10. In some cases, integrity data may include meta data associated with one or more parameters of an endpoint. For example, with respect to network endpoint 4A, collected integrity data may include information relating to the existence or type of operating system installed on network endpoint 4A, or the existence or type of anti-virus software installed on network endpoint 4A. In one embodiment, each individual collection module of an endpoint may collect a specified type of integrity data. For example, with respect to network endpoint 4A, integrity data collection module 6A may collect operating system data, while integrity data collection module 6N may collect anti-virus data.

Each network endpoint 4A-4N is capable of sending integrity data across network 10 to network entity 12. Network 10 may comprise any form of network, such as a private network or a public network (e.g., Internet). Each data collection module is capable of sending integrity data to network entity 12. For example, integrity data collection modules 6A-6N (in network endpoint 4A) and integrity data collection modules 8A-8N (in network endpoint 4N) are each capable of collecting respective integrity data and sending such data to network entity 12 via network 10.

Network entity 12 includes one or more integrity data verification modules 14A-14N (collectively, 14), an integrity evaluation module 18, and a security policy 20. Verification modules 14 are capable of testing and verifying the integrity data that is received from network endpoints 4A-4N. For example, verification modules 14 may verify, from the received integrity data, that network endpoints 4A-4N have the appropriate operating systems and/or anti-virus programs to comply with security policy 20 and obtain access to network entity 12 via network 10.

In some cases, each individual integrity data verification module 14A-14N is capable of verifying a particular type of integrity data based upon one or more verification tests. For example, integrity data verification module 14A may verify integrity data associated with installed operating systems, while integrity data verification module 14N may verify integrity data associated with installed anti-virus programs. Verification module 14A may determine whether each network endpoint 4A-4N has the proper type, or version, of installed operating system in order to obtain access, as defined by security policy 20. Verification module 14N may determine whether each network endpoint 4A-4N has the proper type, or version, of installed anti-virus program, as defined by security policy 20. In some cases, verification modules 14A-14N may receive corresponding integrity data directly from one or more individual integrity data collection modules. For example, if integrity data collection module 6A collects and sends data related to the operating system installed on network endpoint 4A, and integrity data collection module 8A collects and sends data related to the operating system installed on network endpoint 4N, verification module 14A may receive and process operating system data from both integrity data collection module 6A and 8A.

Verification test data provided by each verification module 14A-14N may include one or more verification test results, one or more remediation actions, and one or more weighting factors. A verification test result indicates a result of the test performed by verification module 14A-14N on corresponding integrity data for an individual endpoint 4A-4N. A remediation action is an action to be performed by network endpoint 4A-4N to comply with security policy 20 when the verification test result indicates a failure. A weighting factor is a factor associated with an individual remediation action.

For example, continuing with the example above, integrity data verification module 14A may perform a test on integrity data received from data collection module 6A to determine if network endpoint 4A has the proper installed operating system to comply with security policy 20. If not, integrity data verification module 14A may generate verification test data indicating a failure of the test, and specifying a remediation action to be performed by network endpoint 4A (e.g., to install the proper operating system) in order to comply with security policy 20. The verification test data may further specify a weighting factor associated with the remediation action. In one embodiment, the weighting factors may each fall within a predetermined range. In this embodiment, each weighting factor may be compared to other weighting factors within this range. In one embodiment, a weighting factor associated with a given remediation action may be assigned, or modified, by an administrator.

Network entity 12 further includes an integrity evaluation module 18, which evaluates the verification test data provided by verification modules 14. Integrity evaluation module 18 is capable of receiving an analyzing the remediation actions that are identified and provided by verification modules 14. In some cases, integrity evaluation module 18 compares the set of received remediation actions and eliminates at least one remediation action within the set based upon the comparison to form a reduced set of remediation actions. For example, integrity evaluation module 18 may eliminate conflicting, contradictory, or redundant remediation actions when forming the reduced set.

In one embodiment, integrity evaluation module 18 may eliminate one or more of the remediation actions based upon a comparison of weighting factors (e.g., costs) that are associated with each of the remediation actions. For example, integrity evaluation module 18 may eliminate a first remediation action that has a higher implementation cost than a second remediation action, assuming that performance of the second remediation action will achieve compliance with security policy 20. In some cases, integrity evaluation module 18 may form the reduced set of remediation actions based upon a minimal set of remediation actions that are to be performed to comply with security policy 20. Integrity evaluation module 18 may then send the reduced set of remediation actions to the endpoint (e.g., network endpoint 4A). Network endpoint 4A may then perform the one or more remediation actions included within the reduced set to achieve compliance with security policy 20 and obtain full access to network entity 12 via network 10.

Security policy 20 may include one or more rules, or security criteria, that may be implemented by verification modules 14 and/or integrity evaluation module 18. In some cases, an administrator of network entity 12 may define one or more of the rules contained within security policy 20. In some cases, network entity 12 may also automatically create or modify the rules within security policy 20 based upon trends or activities within system 2. Security policy 20 generally defines the criteria that are to be satisfied by network endpoints 4A-4N in order to have full access to network entity 12 via network 10. Security policy 20 may include rules, for example, relating to the type of operating system, anti-virus software, firewall, patches/upgrades, or other components that are to be installed on an individual endpoint before full access to network entity 12 is granted. The rules may define various combinations of components that may be implemented in order to satisfy the rules for compliance.

System 2 of FIG. 1 provides various advantages. Because integrity evaluation module 18 is capable of analyzing and reducing the number of remediation actions that are to be performed, particularly with respect to redundant actions, network endpoints 4A-4N may be able to become compliant with security policy 20 in a more effective and efficient manner. In addition, because integrity evaluation module 18 is capable of eliminating remediation actions that may conflict with others, integrity evaluation module 18 may lower the possibility of providing remediation actions to network endpoints 4A-4N that may create problematic or invalid states on these endpoints. For example, if verification module 14 identifies two separate remediation actions to install different types of anti-virus software, integrity evaluation module 18 may eliminate one of these two remediation actions, given than an individual network endpoint may enter a problematic state upon installation of two different types of anti-virus software. By eliminating one of the remediation actions, the network endpoint may install just one type of anti-virus software to achieve compliance to security policy 20.

Figure 2A:
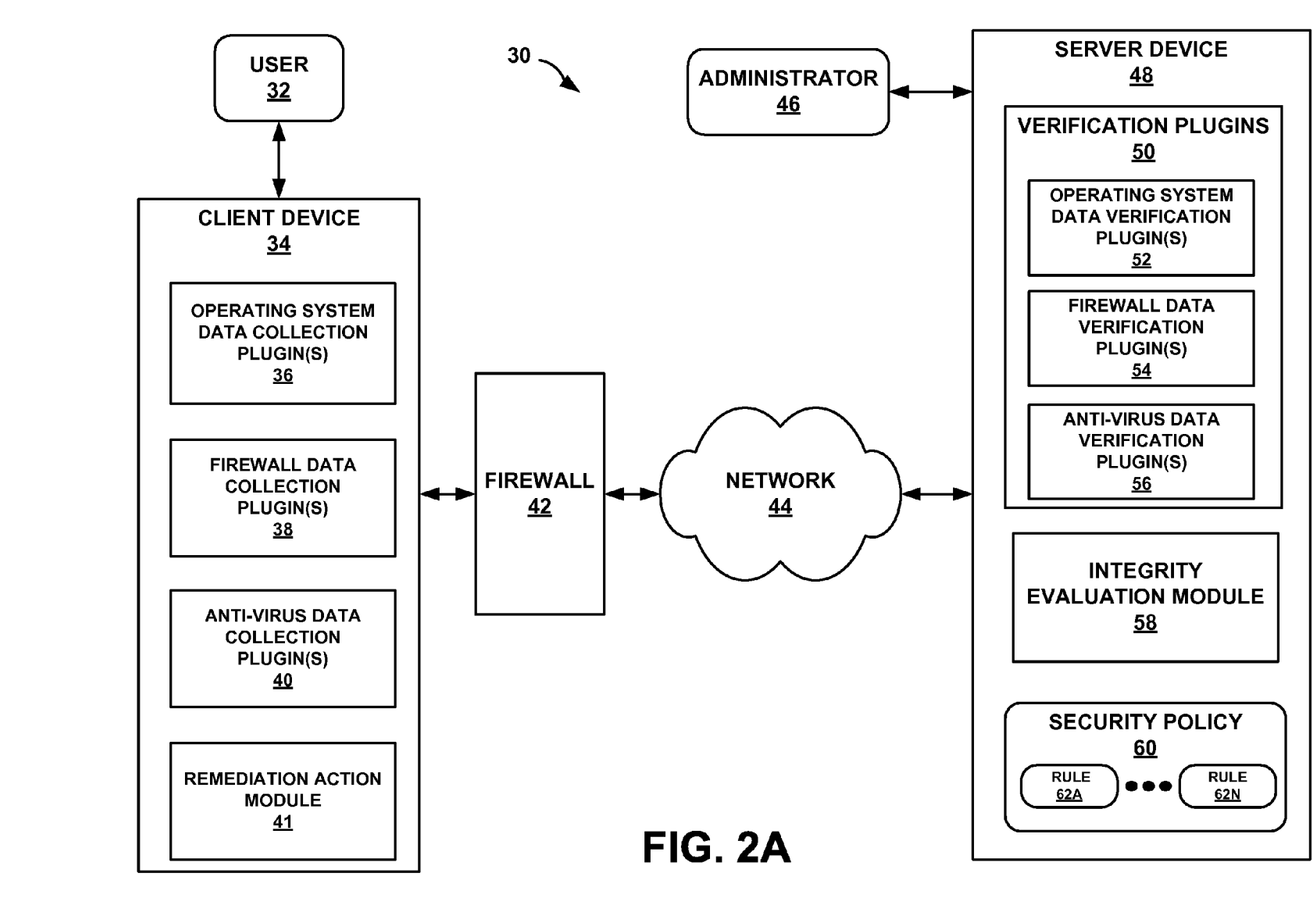
FIG. 2A is a block diagram illustrating a client device coupled to a server device via a network in a system, where the server device evaluates integrity data provided by the client device, according to one embodiment.

FIG. 2A is a block diagram illustrating a client device 34 coupled to a server device 48 via a network 44 in a system 30, where server device 48 evaluates integrity data provided by client device 34, according to one embodiment. Client device 34 may, in some cases, be part of one of the network endpoints 4A-4N shown in FIG. 1. In addition, server device 48 may, in some cases, be part of network entity 12 shown in FIG. 1.

In FIG. 2A, a user 32 may use or otherwise interact with client device 34. User 32 may be a human user, and client device 34 may comprise a computing device, such as a personal computer. In order to communicate with server device 48 via network 44, client device 34 may utilize a firewall 42. Firewall 42 may be part of client device 34, or may be part of a separate computing device. In some cases, firewall 42 may comprise software that is installed on, and may be executed by, client device 34.

Client device 34 includes one or more operating system data collection plugins 36, one or more firewall data collection plugins 38, and one or more anti-virus data collection plugins 40. In one embodiment, each of plugins 36, 38, and 40 may be part of an integrity data collection module, such as integrity data collection module 6A-6N or 8A-8N.

Operating system data collection plugins 36 are capable of collecting integrity data from client device 34 related to the operating system that is installed and operational on client device 34. For example, one of plugins 36 may collect data related to the model or version of the operating system that is installed. Another one of plugins 36 may collect data related to patches or upgrades that may have been installed for the operating system. In some cases, a single plugin may collect and provide all data related to operating system characteristics for client device 34.

Firewall data collection plugins 38 are capable of collecting integrity data from client device 34 related to firewall 42. For example, one of plugins 38 may collect data related to the model or version of firewall 42. Another one of plugins 38 may collect data related to whether firewall 42 is operational or enabled. In some cases, a single plugin may collect and provide all data related to firewall 42.

Anti-virus data collection plugins 40 are capable of collecting integrity data from client device 34 related to the anti-virus software that is installed and operational on client device 34. For example, one of plugins 40 may collect data related to the model or version of the anti-virus software that is installed. Another one of plugins 40 may collect data related to patches or upgrades that may have been installed for the anti-virus software. In some cases, a single plugin may collect and provide all data related to the anti-virus software for client device 34. In some cases, multiple ones of plugins 40 may check for different types of anti-virus software that may be installed on client device 34.

An administrator 46 may use or otherwise interact with server device 48. The administrator 46 may be a human administrator. Administrator 46 may configure one or more aspects of server device 48, and may also define one or more of rules 62A-62N that are included within security policy 60.

Server device 48 includes verification plugins 50, which may be part of verification modules 14 shown in FIG. 1, in some cases. Verification plugins 50 include one or more operating system data verification plugins 52, one or more firewall data verification plugins 54, and one or more anti-virus data verification plugins 56. These plugins 52, 54, and 56 may, in one embodiment, be part of integrity data verification modules 14A-14N. Operating system data verification plugins 52 are capable of analyzing and verifying operating system integrity data received from client device 34. Firewall data verification plugins 54 are capable of analyzing and verifying firewall integrity data received from client device 34. Anti-virus data verification plugins 56 are capable of analyzing and verifying anti-virus integrity data received from client device 34.

Integrity evaluation module 58 may analyze and process the verification test data generated by verification plugins 50. In one embodiment, integrity evaluation module 58 may be part of integrity evaluation module 18 shown in FIG. 1. Similar to integrity evaluation module 18, integrity evaluation module 58 of FIG. 2A is capable of comparing remediation actions that are identified by verification plugins 50, and eliminating at least one of these actions based upon the comparison to form a reduced set of actions. Integrity evaluation module 58 may then send the reduced set of actions to remediation action module 41 of client device 34. Remediation action module 41 may then provide (e.g., display) to user 32 the actions in the reduced set to be performed in order to achieve compliance with security policy 60, such that user 32 knows which actions to take (e.g., install certain software). In some cases, remediation action module 41 may automatically be able to perform certain remediation actions.

Figure 2B:
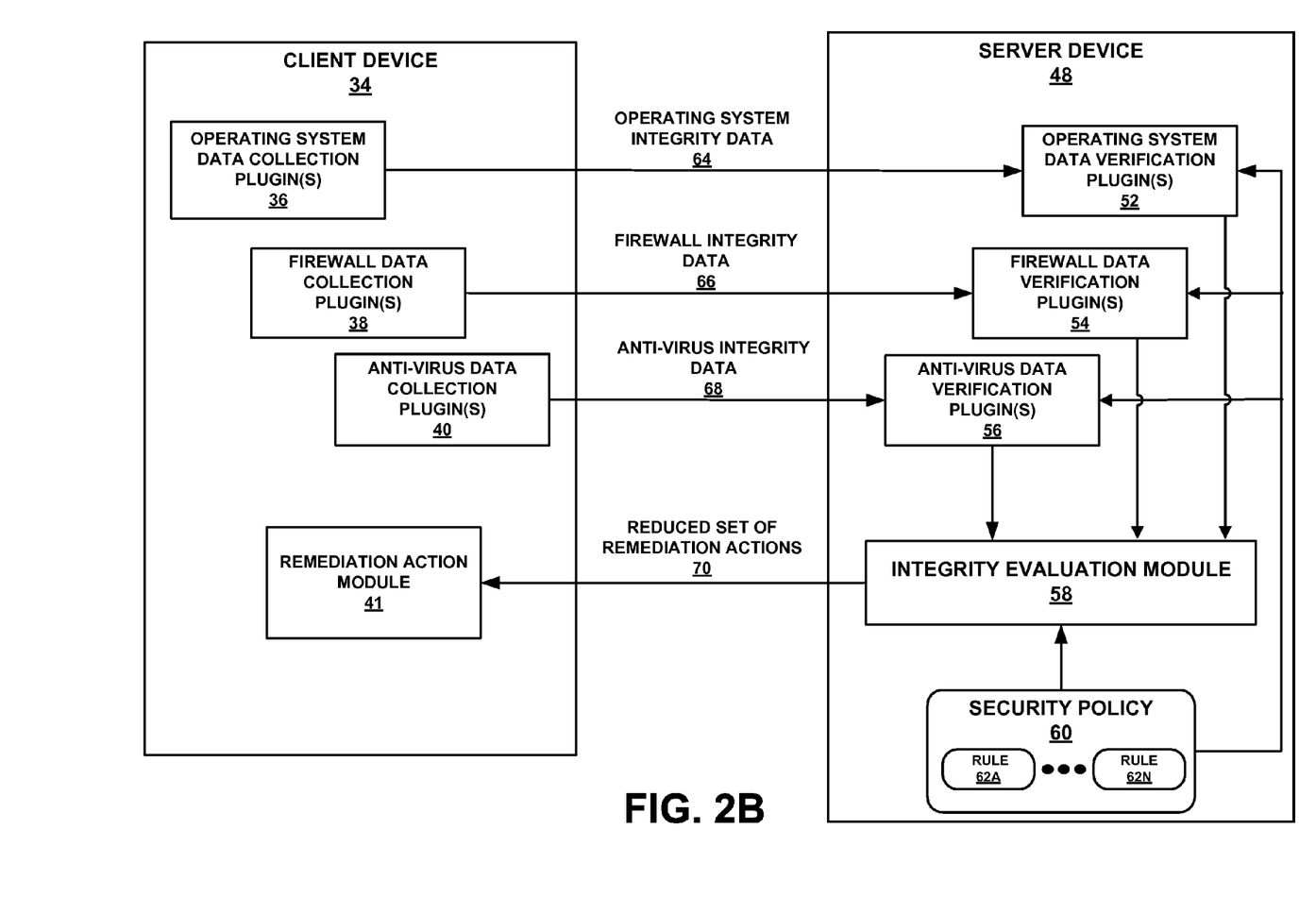
FIG. 2B is a block diagram illustrating additional details of the flow of information between the client device and the server device shown in FIG. 2A, according to one embodiment.

FIG. 2B is a block diagram illustrating additional details of the flow of information between client device 34 and server device 48 shown in FIG. 2A, according to one embodiment. As is shown in FIG. 2B, the individual plugins 36, 38, and 40 of client device 34 communicate with corresponding plugins 52, 54, and 56 of server device 48. Operating system data collection plugins 36 are capable of collecting operating system integrity data 64 from client device 34 and sending such data to the corresponding operating system data verification plugins 52 on server device 48. The one or more operating system data verification plugins 52 may then analyze operating system integrity data 64.

For example, operating system data verification plugins 52 may perform one or more verification tests on operating system integrity data 64 to generate verification test data for each verification test. The verification test data generated by each verification test may comprise a verification test result. The verification tests that are performed may be based upon one or more of rules 62A-62N defined in security policy 60. When a verification test result indicates a failure, the verification test data provides by operating system data verification plugins 52 may include one or more remediation actions and weighting factors (e.g., cost values) associated with each action. For example, one or more of rules 62A-62N of security policy 60 may specify that client 34 is to have operating system "A" installed. Operating system data verification plugins 52 may then test operating system integrity data 64 provided by operating system data collection plugins 36 to determine if client device 34 has operating system "A" installed. If not, operating system data verification plugins 52 may indicate a failure of the verification test, and specify a remediation action of installing operating system "A" on client device 34 to become compliant with security policy 60. Operating system data verification plugins 52 may also associate a weighting factor with the action, as will be described in more detail below.

In a similar fashion, firewall data collection plugins 38 on client device 34 are capable of collecting and sending firewall integrity data 66 to firewall data verification plugins 54 on server device 48. Firewall data verification plugins 54 may perform one or more tests on firewall integrity data 66 based upon one or more of rules 62A-62N defined in security policy 60. For example, firewall data verification plugins 54 may determine whether client device 34 has a particular type of firewall 42 in use, or whether firewall 42 is enabled. If firewall data verification plugins 54 determine any failures from the tests, plugins 54 may specify one or more remediation actions (e.g., enable firewall 42) and associated weighting factors.

Anti-virus data collection plugins 40 on client device 34 are capable of collecting and sending anti-virus integrity data 68 to anti-virus data verification plugins 56 on server device 48. Anti-virus data verification plugins 56 may perform one or more tests on anti-virus integrity data 68 based upon one or more of rules 62A-62N defined in security policy 60. For example, anti-virus data verification plugins 56 may determine whether client device 34 has a particular type or version of anti-virus software installed. If anti-virus data verification plugins 56 determine any failures from the tests, plugins 56 may specify one or more remediation actions (e.g., install one or more anti-virus programs) and associated weighting factors.

Integrity evaluation module 58 receives the verification test data provided from each of verification plugins 52, 54, and 56, and analyzes the verification tests results. For those test results indicating a failure, integrity evaluation module 58 may compare the corresponding remediation actions that have been identified by verification plugins 52, 54, and 56. Integrity evaluation module 58 may then eliminate at least one of these remediation actions based upon the comparison to form a reduced set of remediation actions 70. Integrity evaluation module 58 may also use one of more of the rules 62A-62N when performing the comparison. Integrity evaluation module 58 may send the reduced set of remediation actions 70 to remediation action module 41. Remediation action module 41 may display reduced set of remediation actions 70 to user 32, so that user 32 knows which remediation actions are to be performed (e.g., installing certain operating system or anti-virus software, enabling firewall 42) in order to bring client device 34 into compliance with security policy 60. In some cases, remediation action module 41 may be able to automatically perform one or more of the remediation actions (e.g., download and install certain software over network 44).

By forming the reduced set of remediation actions 70, server device 48 is capable of providing a reduced, and often minimal, group of remediation actions that are to be performed by client device 34 in order to achieve compliance with security policy 60. Integrity evaluation module 58 is capable of eliminating potentially redundant, or even contradicting, remediation actions identified by verification plugins 52, 54, and 56 when forming the reduced set of remediation actions 70.

For example, one anti-virus plugin within anti-virus data verification plugins 56 may determine that client device 34 does not have a first anti-virus program "A" installed, and identify a corresponding remediation action to install anti-virus program "A." A second, separate anti-virus plugin within anti-virus data verification plugins 56 may determine that client device 34 does not have a second anti-virus program "B" installed, and identify a corresponding remediation action to install anti-virus program "B." Upon receipt of the verification data from both of these plugins within anti-virus data verification plugins 56, integrity evaluation module 58 may determine, from one or more of rules 62A-62N within security policy 60, that client device 34 may only need to install anti-virus program "A" or "B" in order to achieve compliance with security policy 60. In this case, integrity evaluation module 58 may eliminate one of the two remediation actions, such that reduced set of remediation actions 70 includes an action to either install anti-virus program "A" or to install anti-virus program "B" (but not both).

In some cases, integrity evaluation module 58 may use weighting factors, or cost values, that are associated with remediation actions when determining which actions to eliminate. For example, continuing with the scenario above, integrity evaluation module 58 may eliminate the action to install anti-virus program "A" if this action has a higher associated cost value than the action to install anti-virus program "B." The cost value may be higher for various reasons, which will be described in more detail below. For example, in some cases, the cost value may be higher to install anti-virus program "A" if this program actually costs more money to purchase or license, if this program consumes more run-time memory or data storage space, if this program is harder or more time-consuming to install, or for various other reasons. In one embodiment, cost values may each fall within a predetermined range. In this embodiment, each cost value may be compared to other cost values within this predetermined range. In one embodiment, administrator 46 may assign, or edit, the cost values that are associated with corresponding remediation actions. In this embodiment, administrator 46 may dynamically change, or manage, the cost values during execution.

In one example scenario, a cost value associated with a given remediation action may have one of the following comparative values: "0" (zero) for a remediation action that may be quickly implemented without substantial delay, network access, or user intervention; "1" (one) for a remediation action that may involve some, or even substantial, delay, but may not involve network access or user intervention; "2" (two) for a remediation action that may involve some, or even substantial, delay and/or network access, but may not involve user intervention; or "3" (three) for a remediation action that may involve delay, network access, and/or user intervention.

Figure 2C:
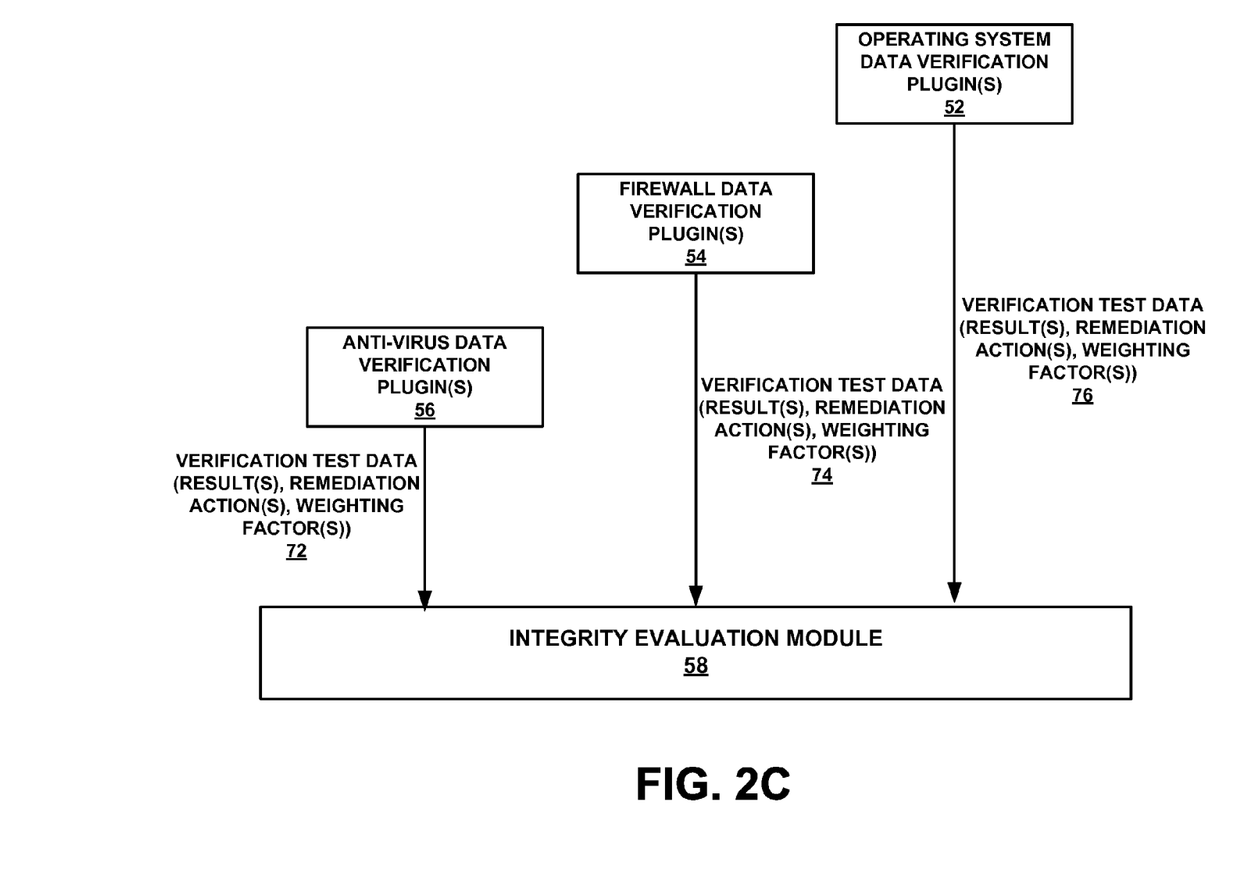
FIG. 2C is a block diagram illustrating additional details on the flow of verification test data from verification plugins to the integrity evaluation module shown in FIG. 2B, according to one embodiment.

FIG. 2C is a block diagram illustrating additional details on the flow of verification test data from verification plugins 52, 54, and 56 to integrity evaluation module 58 shown in FIG. 2B, according to one embodiment. As is shown in FIG. 2C, each of the verification plugins 52, 54, and 56 provide verification test data to integrity evaluation module 58 for processing.

For example, the one or more operating system data verification plugins 52 provide verification test data 76 to integrity evaluation module 58 based upon the one or more verification tests that are performed on operating system integrity data 64. Verification test data 76 may include test data for each verification test that is performed. For example, for each test that is performed by operating system data verification plugins 52, verification test data may include a verification test result, a remediation action, and a weighting factor (e.g., cost value). The verification test result indicates the outcome of the test. If the test result indicates a failure, the remediation action specifies the action that is to be performed, and the weighting factor indicates a weight that is associated with the remediation action. In the example of FIG. 2C, verification plugins 52 provide any weighting factors to integrity evaluation module 58. In other examples, integrity evaluation module 58 may determine the weighting factors based upon the other verification test data that is received.

Similarly, firewall data verification plugins 54 provide verification test data 74 to integrity evaluation module 58. Verification test data 74 may include one or more verification test results, one or more remediation actions related to firewall functionality, and one or more associated weighting factors. Anti-virus data verification plugins 56 provide verification test data 72 to integrity evaluation module 58. Verification test data 72 may include one or more verification test results, one or more remediation actions related to anti-virus functionality, and one or more associated weighting factors.

Integrity evaluation module 58 receives the verification test data 72, 74, and 76 and compares the identified set of remediation actions based upon the test results included within verification test data 72, 74, and/or 76. Integrity evaluation module 58 may then eliminate at least one remediation action based upon the comparison (e.g., based on the weighting factors or action redundancy) to form reduced set of remediation actions 70.

Figure 3:
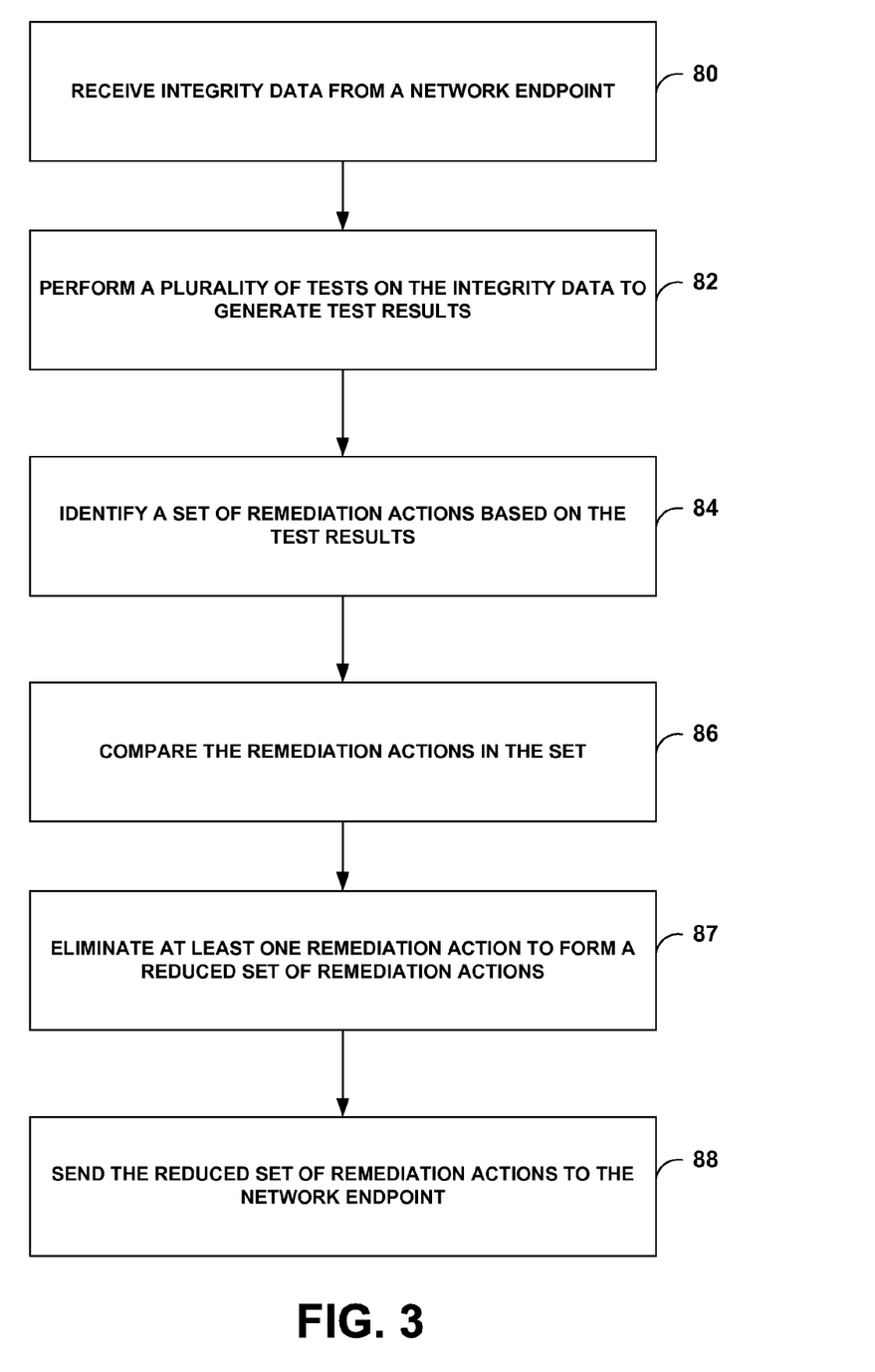
FIG. 3 is a flow diagram illustrating a method that may be performed by the network entity 12 shown in FIG. 1 and/or by the server device shown in FIG. 2A, according to one embodiment.

FIG. 3 is a flow diagram illustrating a method that may be performed by network entity 12 (FIG. 1) and/or by server device 48 (FIG. 2A), according to one embodiment. For purposes of illustration only, it will be assumed in the subsequent description that the method shown in FIG. 3 is performed by network entity 12.

Verification modules 14 of network entity 12 receive integrity data via network 10 from a network endpoint, such as network endpoint 4A (80). In some cases, verification modules 14 may receive integrity data from multiple integrity data collection modules, such as from integrity data collection modules 6A-6N of network endpoint 4A.

Verification modules 14 perform a plurality of tests on the received integrity data to generate corresponding testing results (82). In some cases, verification modules 14 may perform a test on the integrity data received from each individual data collection module (e.g., from each of the one or more integrity data collection modules 6A-6N) to generate a corresponding test result.

In one embodiment, verification modules 14 may perform a plurality of verification tests on the integrity data to generate corresponding verification test data for each verification test. The verification test data generated by each verification test may include a verification test result. When the verification test result indicates a failure, the verification test data for the corresponding verification test may further include a remediation action and a weighting factor (e.g. a cost value). In some cases, verification modules 14 may perform a plurality of integrity tests on the verification test data generated by each verification test, where the integrity tests are based upon one or more rules defined by security policy 20.

Upon testing of the integrity data received from a network endpoint, such as network endpoint 4A, network entity 12 may use verification modules 14 to identify a set of remediation actions based upon the test results (84). The set of remediation actions may include one or multiple actions.

Integrity evaluation module 18 compares the remediation actions in the set (86). When each remediation action in the set is associated with a weighting factor, integrity evaluation module 18 is capable of comparing the weighting factors that are associated with the remediation actions in the set.

Integrity evaluation module 18 may then eliminate at least one remediation action in the set based upon the comparison to form a reduced set of remediation actions (87). The reduced set may include one or multiple remediation actions.

To provide an example, the set of remediation actions may include a first remediation action and a second remediation action, each of which are associated with a corresponding weighting factor. Integrity evaluation module 18 may compare a first weighting factor associated with the first remediation action to a second weighting factor associated with the second remediation action, and then eliminate the first remediation action based upon the comparison of the first weighting factor to the second weighting factor to form the reduced set of remediation actions. The reduced set, in this example, includes the second remediation action. In one scenario, integrity evaluation module 18 may eliminate the first remediation action based upon the first weighting factor being greater than the second weighting factor. In another scenario, integrity evaluation module 18 may eliminate the first remediation action based upon the first weighting factor being less than the second weighting factor.

In one embodiment, integrity evaluation module 18 may eliminate the first remediation action based upon an identification of it as being a redundant remediation action. For example, if the first and second remediation actions are substantially the same, integrity evaluation module 18 may eliminate the first remediation action as a duplicative action.

Integrity evaluation module 18 is capable of sending the reduced set of remediation actions to the network endpoint, such as network endpoint 4A (88). Each remediation action in the reduced set may specify 7 an action to be performed by the network endpoint to achieve compliance with security policy 20.

In one embodiment, network entity 12 may repeating the performing of the tests (82), the identifying of the set of remediation actions (84), the comparing of the remediation actions in the set (86), and the eliminating of the at least one remediation action in the set (87) for multiple iterations to form the reduced set of remediation actions.

Figure 4:
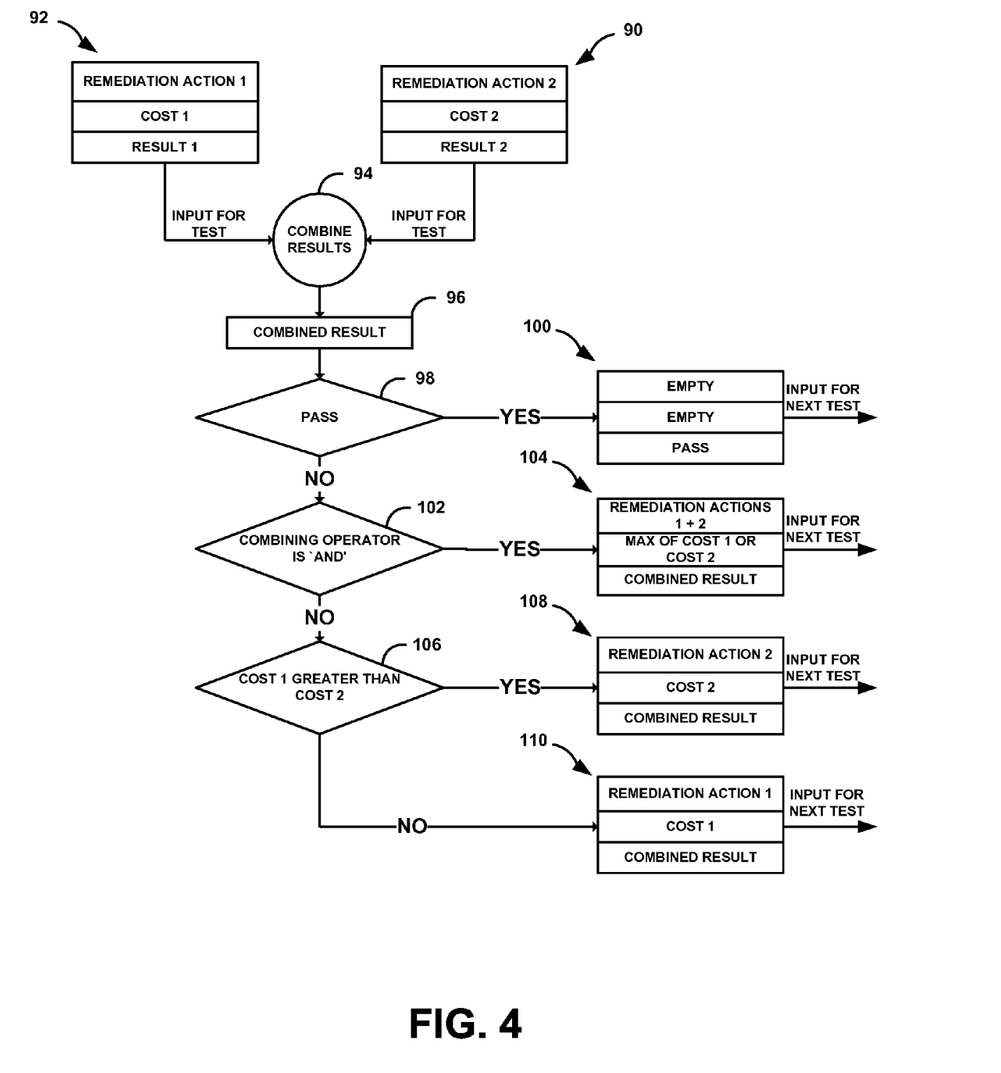
FIG. 4 is a flow diagram illustrating a method that may be performed by the network entity shown in FIG. 1 and/or the server device shown in FIG. 2A to analyze cost values associated with remediation actions, according to one embodiment.

FIG. 4 is a flow diagram illustrating a method that may be performed by network entity 12 (FIG. 1) and/or server device 48 (FIG. 2A) to analyze cost values associated with remediation actions, according to one embodiment. For purposes of illustration only, it will be assumed in the subsequent description that the method of FIG. 4 is performed by server device 48.

As shown in FIG. 4, integrity evaluation module 58 of server device 48 receives verification test data from one or more of verification plugins 50. Integrity evaluation module 58 may build a test node for each set of verification test data that is received from an individual verification plugin within plugins 50. In FIG. 4, two such test nodes 90 and 92 are shown. Each test node 90 and 92 includes a verification test result, a remediation action, and a cost value from the verification test data that is received from one verification plugin upon performance of a verification test. In one example, one of verification plugins 50 may generate test data used to generate test node 90 based upon one or more verification tests that are performed on integrity data received from client device 34 (e.g., from one of data collection plugins 36, 38, or 40), and another one of verification plugins 50 may generate test data that is used to generate test node 92.

Test nodes 90 and 92 serve as inputs for an integrity test that is to be performed by integrity evaluation module 58, which combines the verification test result of test node 90 ("RESULT 2") with the verification test result of test node 92 ("RESULT 1") (94) to obtain a combined result (96).

Figure 5:
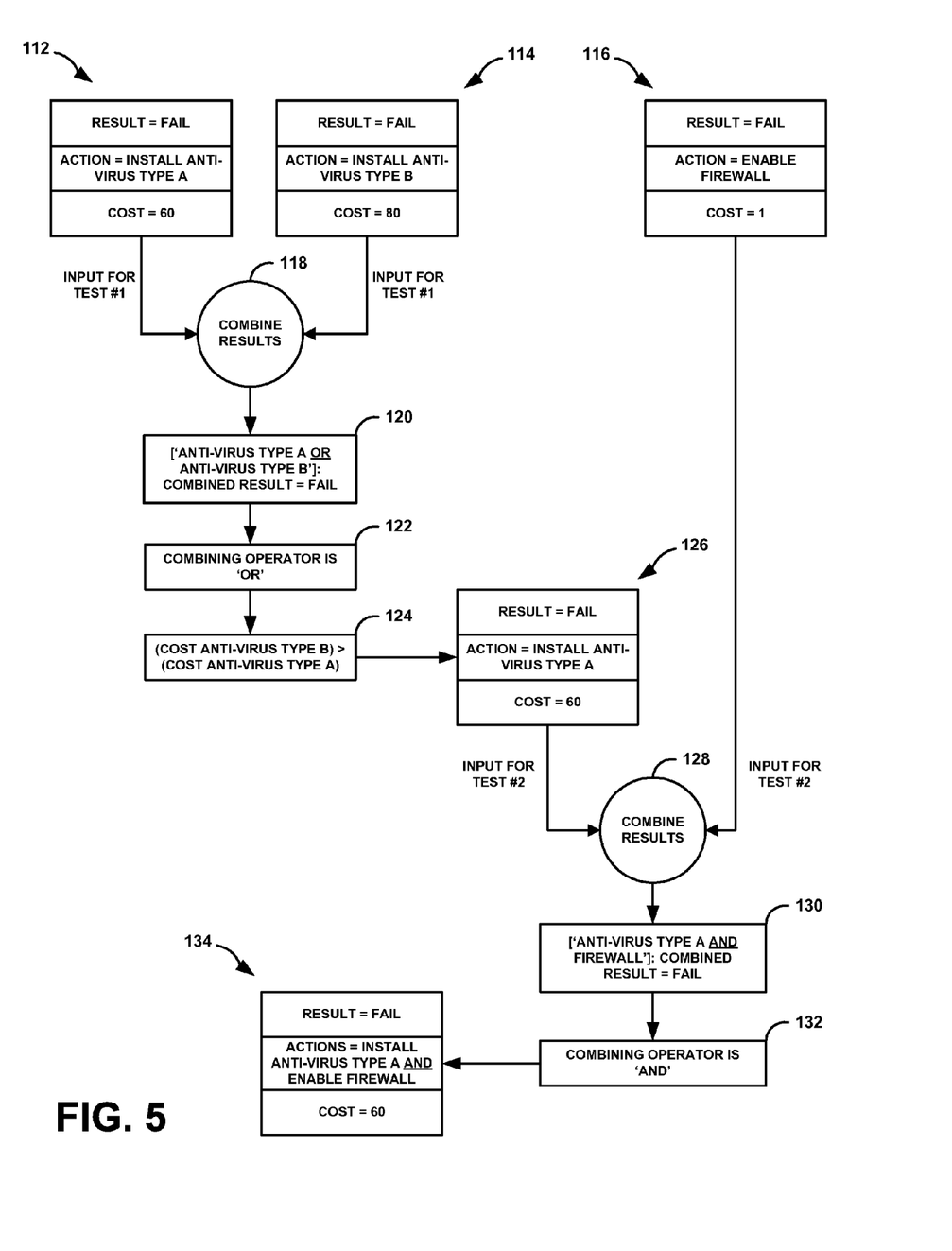
FIG. 5 is a flow diagram illustrating a method that may be performed by the network entity shown in FIG. 1 and/or the server device shown in FIG. 2A to analyze cost values associated with anti-virus remediation actions, according to one embodiment.

Integrity evaluation module 58 may use one or more of rules 62A-62N of security policy 60 to determine the combined result. Integrity evaluation module 58 may use the rules to generate a formula, or algorithm, to determine the combined result. For example, integrity evaluation module 58 may determine that the combined result is PASS if the test result for both test node 90 and test node 92 indicate PASS. In another example, integrity evaluation module 58 may determine that the combined result is PASS if the test result for either test node 90 or test node 92 indicates a PASS. (FIG. 5 shows a more specific example.)

Integrity evaluation module 58 may use a formula, or algorithm, to combine individual test results to obtain the combined result. In some cases, the formula, or algorithm, may include a Boolean operator. If the Boolean operator comprises an AND operator, the formula, or algorithm, may specify that the combined result is true when the result of test node 90 and the result of test node 92 are both true. The Boolean operator may also comprise an OR or a NOT operator, in some cases, depending on the rules 62A-62N defined by security policy 60.

If the combined test result is PASS (98), then integrity evaluation module 58 may create a new test node 100 that includes a combined result of PASS. Because the combined result is PASS, no remediation action or cost value is included within test node 100. Test node 100 may then serve as input for a subsequent integrity test performed by integrity evaluation module 58. In this embodiment, integrity evaluation module 58 performs individual integrity tests using two test nodes at a time. Test node 100 may serve as one of the two inputs to the next test. The second test node, in some cases, may comprise a test node that is created from another set of verification test data that is provided by verification plugins 50.

If combined result is FAIL, then integrity evaluation module 58 determines, in one embodiment, whether the combining operator that was used to combine the results (94) is an AND operator (102). As described previously, a Boolean AND combining operator specifies that the combined result is TRUE when the test result from test node 90 and from test node 92 are both true. If the combining operator is an AND operator (102), then integrity evaluation module 58 creates a new test node that includes the combined result (96), along with the combination of remediation actions specified by test nodes 90 and 92. Because the combining operator is AND, the remediation actions specified by test nodes 90 and 92 are both to be performed. In addition, test node 104 includes the maximum of the cost values specified by test nodes 90 and 92. The maximum cost value is selected because, in this example, both remediation actions are to be performed. Test node 104 may serve as an input node for a subsequent iteration of an integrity test that is to be performed by integrity evaluation module 58.

If, however, the combining operator that is used to obtain the combined result does not comprise an AND operator (e.g., if the operator is an OR or a NOT operator), integrity evaluation module 58 compares the cost values specified in test nodes 90 and 92 (106). The cost value specified in test node 90 is associated with the remediation action specified by test node 90, and the cost value specified in test node 92 is associated with the remediation action specified by test node 92. In one embodiment, the verification plugins 50 specify the cost values for the individual remediation actions that are included within test nodes 90 and 92. In one embodiment, integrity evaluation module 58 may determine and/or specify the cost values.

In some cases, lengthy, intrusive, or computationally intensive remediation actions may be associated with higher costs. In some cases, remediation actions that may cost more money to implement, may consume more run-time memory or data storage space, or may be more time-consuming to install, may also be associated with higher costs. In one embodiment, a cost value may directly specify a relative time value for implementation of an associated remediation action. A remediation action having a lower cost value may take less time to implement or perform. In one embodiment, the cost values may be weighting factors that are used to weight their associated remediation actions.

If integrity evaluation module 58 determines that the cost value for the remediation action included within test node 92 is greater than the cost value for the remediation action included within test node 90, then integrity evaluation module 58 eliminates the remediation action included within test node 92. Integrity evaluation module 58 builds a test node 108 that includes the combined result, the cost value specified in test node 90, and the remediation action included within test node 90.

If, on the other hand, integrity evaluation module 58 determines that the cost value for the remediation action included within test node 92 is less than or equal to the cost value for the remediation action included within test node 90, then integrity evaluation module 58 eliminates the remediation action included within test node 90. Integrity evaluation module 58 builds a test node 110 that includes the combined result, the cost value specified in test node 92, and the remediation action included within test node 92.

Test node 100, 104, 108, or 110 may serve as one input for a subsequent integrity test that is to be performed by integrity evaluation module 58. Integrity evaluation module 58 may, in one embodiment, use two test nodes for each iteration of integrity testing. One of the test nodes may comprise test node 100, 104, 108, or 110. A second test node may comprise a node created from additional verification test data provided by one of verification plugins 50.

There may be multiple benefits of reducing a full set of remediation actions to a reduced set with a decreased, or minimum, number of lowest cost actions that may be performed by client device 34 to become compliant with security policy 60. For example, client device 34 may not need to perform potentially conflicting remediation actions, and it may take less time for client device 34 to achieve compliance since it does not necessarily need to perform actions with higher cost. In addition, less data may need to be transmitted from server device 48 to client device 34 when providing the reduced set of actions.

FIG. 5 is a flow diagram illustrating a method that may be performed by network entity 12 (FIG. 1) and/or server device 48 (FIG. 2A) to analyze cost values associated with anti-virus remediation actions, according to one embodiment. For purposes of illustration only, it will be assumed in the subsequent description that the method of FIG. 5 is performed by server device 48.

As shown in FIG. 5, integrity evaluation module 58 of server device 48 receives verification test data from verification plugins 50. In this example, it is assumed that integrity evaluation module 58 receives test data from two of anti-virus data verification plugins 56 and from one of firewall verification plugins 54 within plugins 50. Each of the two anti-virus plugins 56 performs a verification test of a portion of the anti-virus integrity data 68 received from anti-virus data collection plugins 40. (In one embodiment, two anti-virus data collection plugins 40 provide corresponding anti-virus integrity data to the two anti-virus data verification plugins 56.) The firewall plugin 54 performs a verification test of the firewall integrity data 66 that is received from one or more of firewall data collection plugins 38.

The plugins 54 and 56 within verification plugins 50 generate corresponding verification test data, which includes verification test results, remediation actions, and cost values associated with these actions. Integrity evaluation module 58 may then build the test nodes 112, 114, and 116 shown in FIG. 5. Test node 112 includes verification test data from one of the anti-virus plugins 56 associated with ANTI-VIRUS TYPE A software, test node 114 includes verification test data from a second one of the anti-virus plugins 56 associated with ANTI-VIRUS TYPE B software, and test node 116 includes verification test data from one of firewall plugins 54 associated with firewall 42. (It is assumed, in this example, that ANTI-VIRUS TYPE A and ANTI-VIRUS TYPE B are separate anti-virus software programs provided by different software vendors.)

Test node 112 includes a verification result of FAIL, indicating that client device 34 does not have ANTI-VIRUS TYPE A software installed. The indicated remediation action is to install ANTI-VIRUS TYPE A software on client device 34, and a cost value of sixty has been assigned. (In one embodiment, plugins 56 assign the cost value, while in another embodiment, integrity evaluation module 58 assigns the cost value. The cost value may comprise a weighting factor, as described previously.)

Test node 114 includes a verification result of FAIL, indicating that client device 34 does not have ANTI-VIRUS TYPE B software installed. The indicated remediation action is to install ANTI-VIRUS TYPE B software on client device 34, and a cost value of eighty has been assigned. Test node 116 includes a verification result of FAIL, indicating that client device 34 does not have firewall 42 enabled. The indicated remediation action is to enable firewall 42 for client device 34, and a cost value of one has been assigned.

Test nodes 112 and 114 serve as the first two inputs for a first integrity test (TEST #1) that is to be performed by integrity evaluation module 58, which combines the verification test result of test node 112 with the verification test result of test node 114 (118).

Integrity evaluation module 58 may use one or more of rules 62A-62N of security policy 60 to determine the combined result (120). Integrity evaluation module 58 may use the rules to generate a formula, or algorithm, to determine the combined result. For example, as shown in FIG. 5, integrity evaluation module 58 uses a formula, or algorithm, to determine whether either ANTI-VIRUS TYPE A software or ANTI-VIRUS TYPE B software is installed on client device 34. The formula may be expressed as follows: ANTI-VIRUS TYPE A OR ANTI-VIRUS TYPE B. Since client device 34 has neither of these two programs installed, the combined result is FAIL.

The combining operator in the formula of this particular example is OR, given that the formula specifies that either ANTI-VIRUS TYPE A or ANTI-VIRUS TYPE B software be installed on client device 34. Because the combining operator is a Boolean OR operator (122), the cost values specified in test nodes 112 and 114 are next compared. Integrity evaluation module 58 determines that the cost value (eighty) that is associated with ANTI-VIRUS TYPE B software, as indicated in test node 114, is greater than the cost value (sixty) that is associated with ANTI-VIRUS TYPE A software, as indicated in test node 112 (124). There may be various possible reasons why ANTI-VIRUS TYPE A software has a smaller, or cheaper, associated cost value. For example, ANTI-VIRUS TYPE A may cost less money to purchase or license, may be easier to install, may take less time to install, or may otherwise be a cheaper alternative.

As a result of the comparison, integrity evaluation module 58 creates a new test node 126. Test node 126 includes the combined result of the first integrity test (TEST #1), which is FAIL. Test node 126 also includes the remediation action specified in test node 112 (install ANTI-VIRUS TYPE A software), which is the action having the lowest associated cost between the actions specified in test nodes 112 and 114 from TEST #1. Test node 126 also includes a cost value of sixty, which is the cost value specified in test node 112.

Integrity evaluation module 58 may then perform a second integrity test (TEST #2) using the test node 126, which was generated as output from TEST #1, as the first input, and using test node 116 as the second input. (In this example, it is assumed that each integrity test uses two input test nodes for each test iteration.)

Integrity evaluation module 58 again uses one or more of rules 62A-62N of security policy 60 to implement a formula, or algorithm, to combine the results included within test nodes 126 and 116 (128). In the example of FIG. 5, integrity evaluation module 58 uses a formula to determine whether client device 34 has ANTI-VIRUS TYPE A software installed and also has firewall 42 enabled. Because client device 34 does not have firewall 42 enabled, and also does not have ANTI-VIRUS TYPE A software installed, integrity evaluation module 58 determines that the combined result is FAIL (130).

Integrity evaluation module 58 also determines that the combining operator of the formula is an AND operator (132). The combining operator is an AND operator given that the ANTI-VIRUS TYPE A software is to be installed and firewall 42 is to be enabled in order for TEST #2 to pass. Because the combining operator is an AND operator, integrity evaluation module 58 creates a new test node 134 that includes both of the remediation actions from test nodes 116 and 126. Thus, test node 134 includes the remediation actions to install ANTI-VIRUS TYPE A software and to enable firewall 42. Test node 134 includes a test result of FAIL, which is the combined result from TEST #2. In addition, test node 134 includes a cost value of sixty, which is the maximum of the cost values from test nodes 116 and 126. It is assumed that the two remediation actions specified in test node 134 may be performed substantially in parallel, or independently. If the actions may be performed sequentially, or may be dependent on one another, the cost value specified in test node 134 may be equal to the sum of the cost values from test nodes 116 and 126.

The example of FIG. 5 assumes that integrity evaluation module 58 generates three initial test nodes 112, 114, and 116 based upon the verification test data generated by verification plugins 50. However, in other examples, integrity evaluation module 58 may generate any number of test nodes based upon the amount of integrity data that is processed by verification plugins 50, and the number of verification tests that are performed. If addition test nodes are generated, test node 134 may serve as one input to a subsequent integrity test that is performed by integrity evaluation module 58, in an attempt to continue to analyze remediation actions and eliminate any redundant, contradicting, or costly actions that may not need to be performed by client device 34 in order to minimally comply with security policy 60.

In the example of FIG. 5, however, test node 134 may be the final generated node based upon the three initial test nodes 112, 114, and 116 and the two integrity tests that are performed (i.e., TEST #1 and TEST #2). In this case, integrity evaluation module 58 may extract the remediation actions included within test node 134 and include such actions within the reduced set of remediation actions 70 that are sent back to client device 34. Client device 34 may then perform these two actions to conform with security policy 60 and gain full access to server device 48.

Figure 6:
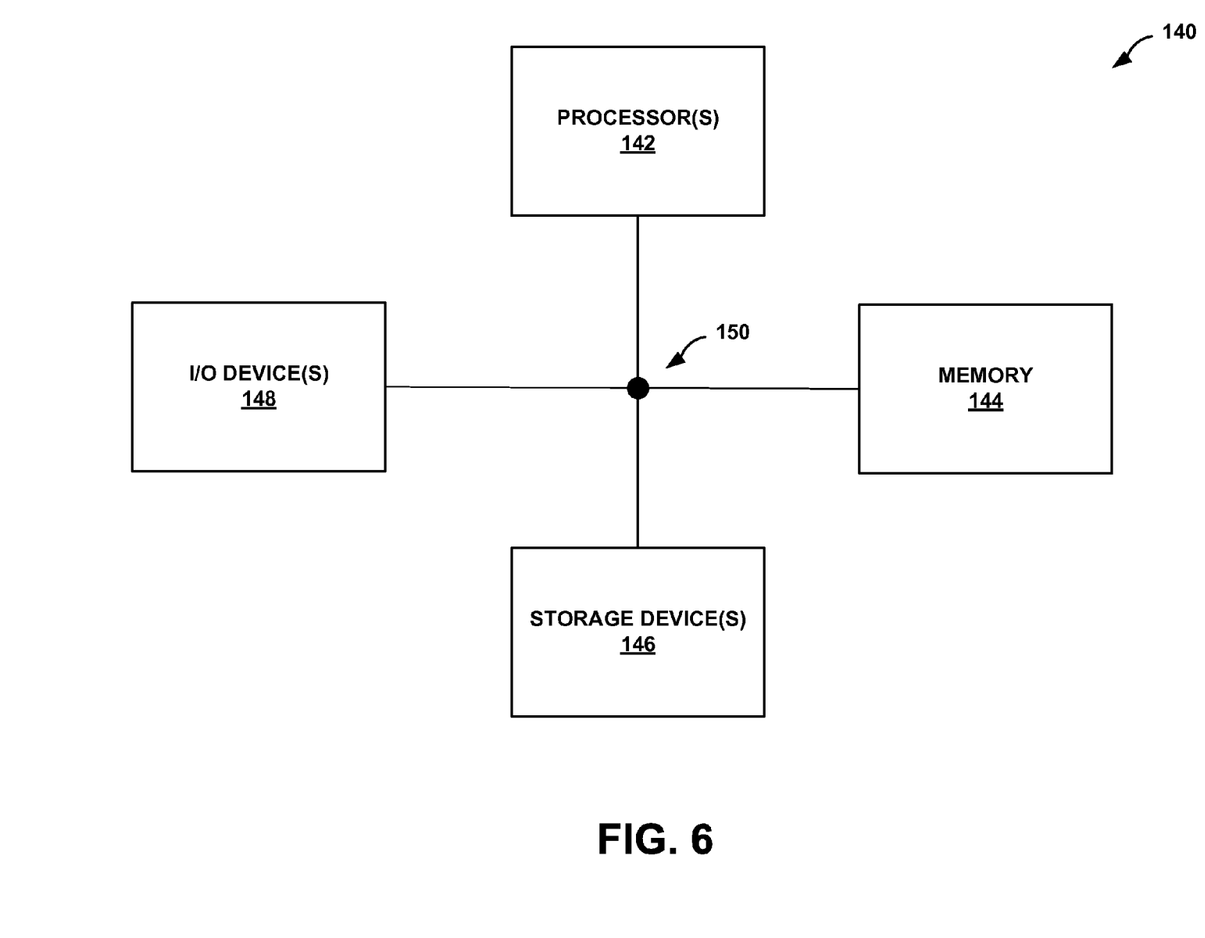
FIG. 6 is a block diagram illustrating a computing system that may be included within any of network endpoints or network entity shown in FIG. 1, or by the client device, firewall, and/or the server device shown in FIG. 2A, according to one embodiment.

FIG. 6 is a block diagram illustrating a computing system 140 that may be included within any of network endpoints 4A-4N, network entity 12 (FIG. 1), client device 34, firewall 42, and/or server device 48 (FIG. 2A), according to one embodiment. Computing system 140 includes one or more processors 142, memory 144, one or more storage devices 146, and one or more input/output device 148.

Processors 142 may include a general purpose microprocessor, a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure suitable for implementation of the techniques described herein. Processors 142 are capable of executing one or more instructions that are stored within memory 144 to implement any of the techniques described herein.

Memory 144, which comprises one or more computer-readable storage media, can include random-access memory (RAM), read-only memory (ROM), Electrically Erasable Programmable ROM (EEPROM), or any other form of fixed or removable storage medium that can be used to carry or store desired program code in the form of instructions or data structures and that can be accessed by a computer. Computing system 140 may further include one or more additional storage devices 146, including fixed or removable storage devices. Storage devices 146 may comprise a Compact Disc ROM (CD-ROM) or other optical disk storage, laser disc, digital versatile disc (DVD), floppy disk, magnetic disk storage or other magnetic storage devices, or any other medium that can be used to carry or store desired program code in the form of instructions or data structures and that can be accessed by a computer.

Computing system 140 may further include one or more input/output devices 148. Input/output devices 148 may, for example, include a keyboard, a mouse, a trackball, a display device (e.g., monitor), a printer, a microphone, speakers, and the like. Input/output devices 148, processors 142, memory 144, and storage devices 146 may be interconnected by one or more connections 150, which may include wired connections and/or wireless connections. For example, in one scenario, connections 150 may include a bus.

In one or more example embodiments, the functions described above may be implemented in hardware, software, firmware, or any combination thereof. If implemented in software, the functions may be stored on or transmitted over as one or more instructions or code on a computer-readable medium that may be executed by one or more processors, such as the one or more processors 142 that may be included within any of network endpoints 4A-4N, network entity 12, client device 34, firewall 42, and/or server device 48. Computer-readable media includes both computer storage media and communication media including any medium that facilitates transfer of a computer program from one place to another. A storage media may be any available media that can be accessed by a computer. By way of example, and not limitation, such computer-readable media can comprise random-access memory (RAM), read-only memory (ROM), Electrically Erasable Programmable ROM (EEPROM), Compact Disc ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk. Combinations of the above should also be included within the scope of computer-readable media.

Various embodiments of the disclosure have been described. These and other embodiments are within the scope of the following claims.

The invention claimed is:

1. A method comprising:

receiving integrity data via a network from a network endpoint;

determining, by a plurality of verification modules and based upon one or more rules defined by a security policy, a plurality of verification tests for the integrity data, wherein the plurality of verification modules includes at least one of an operating system data verification module, a firewall data verification module, or an anti-virus data verification module;

performing, by the plurality of verification modules, the plurality of verification tests on the integrity data to generate a plurality of verification test results, wherein each verification module of the plurality of verification modules performs at least one verification test of the plurality of verification tests to generate at least one corresponding verification test result of the plurality of verification test results;

responsive to determining that at least two of the verification test results indicate a failure, identifying a set of remediation actions and associated weighting factors to achieve compliance with the security policy, wherein each remediation action in the set of remediation actions is associated with a weighting factor, and wherein each verification module of the plurality of verification modules that generates at least one corresponding verification test result indicating a failure is configured to identify at least one corresponding remediation action in the set of remediation actions and at least one associated weighting factor;

combining, using the one or more rules defined by the security policy, the at least two of the verification test results to obtain a combined result;

responsive to determining that the combined result indicates a failure:

comparing a first weighting factor associated with a first remediation action to a second weighting factor associated with a second remediation action, wherein the first remediation action and the second remediation action are each included in the set of remediation actions and are identified by the at least one of the operating system data verification module, the firewall data verification module, or the anti-virus data verification module; and eliminating, based upon the comparison of the first weighting factor to the second weighting factor, at least the first remediation action from the set of remediation actions to form a reduced set of remediation actions, wherein the first remediation action is at least one of a conflicting or a redundant action with respect to the second remediation action, and wherein the reduced set of remediation actions includes the second remediation action but not the first remediation action; and sending the reduced set of remediation actions to the network endpoint.

2. The method of claim 1, wherein the reduced set of remediation actions comprises multiple remediation actions.

3. The method of claim 1, wherein eliminating the first remediation action based upon the comparison of the first weighting factor to the second weighting factor comprises eliminating the first remediation action based upon the first weighting factor being greater than the second weighting factor.

4. The method of claim 1, wherein eliminating the first remediation action based upon the comparison of the first weighting factor to the second weighting factor comprises eliminating the first remediation action based upon the first weighting factor being less than the second weighting factor.

5. The method of claim 1, wherein:

receiving the integrity data comprises receiving the integrity data from one or more data collection modules on the network endpoint; and performing the plurality of verification tests on the integrity data comprises performing a verification test on corresponding integrity data received from each individual data collection module to generate the corresponding verification test result.

6. The method of claim 1, further comprising repeating the performing of the verification tests, the identifying of the set of remediation actions, the combining, the comparing, and the eliminating for multiple iterations to form the reduced set of remediation actions.

7. A non-transitory computer-readable storage medium comprising instructions that cause one or more processors to:

receive integrity data via a network from a network endpoint;

determine, by a plurality of verification modules and based upon one or more rules defined by a security policy, a plurality of verification tests for the integrity data, wherein the plurality of verification modules includes at least one of an operating system data verification module, a firewall data verification module, or an anti-virus data verification module;

perform, by the plurality of verification modules, the plurality of verification tests on the integrity data to generate a plurality of verification test results, wherein each verification module of the plurality of verification modules performs at least one verification test of the plurality of verification tests to generate at least one corresponding verification test result of the plurality of verification test results;

responsive to determining that at least two of the verification test results indicate a failure, identify a set of remediation actions and associated weighting factors to achieve compliance with the security policy, wherein each remediation action in the set of remediation actions is associated with a weighting factor, and wherein each verification module of the plurality of verification modules that generates at least one corresponding verification test result indicating a failure is configured to identify at least one corresponding remediation action in the set of remediation actions and at least one associated weighting factor;

combine, using the one or more rules defined by the security policy, the at least two of the verification test results to determine a combined result;

responsive to determining that the combined result indicates a failure:

compare a first weighting factor associated with a first remediation action to a second weighting factor associated with a second remediation action, wherein the first remediation action and the second remediation action are each included in the set of remediation actions and are identified by the at least one of the operating system data verification module, the firewall data verification module, or the anti-virus data verification module; and eliminate, based upon the comparison of the first weighting factor to the second weighting factor, at least the first remediation action from the set of remediation actions to form a reduced set of remediation actions, wherein the first remediation action is at least one of a conflicting or a redundant action with respect to the second remediation action, and wherein the reduced set of remediation actions includes the second remediation action but not the first remediation action; and send the reduced set of remediation actions to the network endpoint.

8. An apparatus comprising:

one or more computer processors; and a non-transitory computer-readable storage medium configured to store a plurality of verification modules and an integrity evaluation module, wherein the plurality of verification modules includes at least one of an operating system data verification module, a firewall data verification module, or an anti-virus data verification module, and wherein the plurality of verification modules are executable by the one or more computer processors to:

receive integrity data via a network from a network endpoint;

determine, based upon one or more rules defined by a security policy, a plurality of verification tests for the integrity data;

perform the plurality of verification tests on the integrity data to generate a plurality of verification test results, wherein each verification module of the plurality of verification modules performs at least one verification test of the plurality of verification tests to generate at least one corresponding verification test result of the plurality of verification test results; and responsive to determining that at least two of the verification test results indicate a failure, identify a set of remediation actions and associated weighting factors to achieve compliance with the security policy, wherein each remediation action in the set of remediation actions is associated with a weighting factor, and wherein each verification module of the plurality of verification modules that generates at least one corresponding verification test result indicating a failure is configured to identify at least one corresponding remediation action in the set of remediation actions and at least one associated weighting factor; and wherein the integrity evaluation module is executable by the one or more computer processors to:

combine, using the one or more rules defined by the security policy, the at least two of the verification test results to determine a combined result;

responsive to determining that the combined result indicates a failure:

compare a first weighting factor associated with a first remediation action to a second weighting factor associated with a second remediation action, wherein the first remediation action and the second remediation action are each included in the set of remediation actions and are identified by the at least one of the operating system data verification module, the firewall data verification module, or the anti-virus data verification module; and eliminate, based upon the comparison of the first weighting factor to the second weighting factor, at least the first remediation action from the set of remediation actions to form a reduced set of remediation actions, wherein the first remediation action is at least one of a conflicting or a redundant action with respect to the second remediation action, and wherein the reduced set of remediation actions includes the second remediation action but not the first remediation action; and send the reduced set of remediation actions to the network endpoint.

9. The apparatus of claim 8, wherein the reduced set of remediation actions comprises multiple remediation actions.

10. The apparatus of claim 8, wherein the integrity evaluation module is configured to eliminate the first remediation action based upon the comparison of the first weighting factor to the second weighting factor at least by eliminating the first remediation action based upon the first weighting factor being greater than the second weighting factor.

11. The apparatus of claim 8, wherein the integrity evaluation module is configured to eliminate the first remediation action based upon the comparison of the first weighting factor to the second weighting factor at least by eliminating the first remediation action based upon the first weighting factor being less than the second weighting factor.

12. The apparatus of claim 8, wherein:

the one or more verification modules are configured to receive the integrity data at least by receiving the integrity data from one or more data collection modules on the network endpoint; and the one or more verification modules are configured to perform the plurality of verification tests on corresponding integrity data at least by performing a verification test on the integrity data received from each individual data collection module to generate the corresponding verification test result.

13. The apparatus of claim 8, wherein:

the one or more verification modules are configured to repeat the performing of the verification tests and the identifying of the set of remediation actions for multiple iterations; and the integrity evaluation module is configured to repeat the comparing and the eliminating for multiple iterations to form the reduced set of remediation actions.

* * * * *